Jan. 22, 1946. E. C. CROWTHER 2,393,520
LOCK NUT
Filed Feb. 24, 1944

WITNESS:

INVENTOR
Edmond C. Crowther
BY
ATTORNEYS.

Patented Jan. 22, 1946

2,393,520

UNITED STATES PATENT OFFICE 2,393,520

LOCK NUT

Edmond C. Crowther, Philadelphia, Pa., assignor to Illinois Tool Works, Chicago, Ill., a corporation of Illinois Application February 24, 1944, Serial No. 523,624

6 Claims. (Cl. 151—21)

This invention relates to an improvement in lock nuts.

More particularly, this invention relates to a lock nut so designed and constructed as to present a nut element and a locking element respectively, of maximum efficiency, the locking element being so designed and constructed as to permit substantially unlimited removal and replacement of the nut without material impairment of the efficiency of the locking element.

The lock nut according to this invention is self-locking and the construction is such that the nut and locking element, respectively, may be made of desired strength and efficacy in their respective functions to meet the requirements of any service with full satisfaction.

Generally speaking, the lock nut according to this invention will comprise essentially a nut element and a locking element, the latter being formed separately and fixedly joined to the nut element to form a unit.

The nut element may be of any ordinary standard type, of any usual material, and which may have been subjected to any standard treatment. However, within the purview of this invention the nut may be made of any desired form and material and subjected to any desired treatment adapting it to any particular service.

The locking element will be of such form as to provide a body for engagement with the body of the nut, preferably embracing it; and to present a plurality of locking fingers extending from the body and formed to have definite spring action. The locking fingers are arranged to present oppositely positioned bearing areas extending in a direction substantially parallel to the axis of the bore of the nut and spaced a distance less than the diameter of the bore of the nut, all to the end that when the nut is applied and set up on a bolt, the locking fingers will exert pressure on the crest of the thread of the bolt, or, if the bearing areas be threaded or partially threaded, as they may be, upon the crest and more or less of the faces of the thread.

The locking element may be made of any suitable material having resilience and such may be the same as or different from that of the nut element. And the locking element may be given any treatment to promote its function, it being understood that the locking fingers may be treated differently from the body portion of the locking element to promote the spring action of the fingers.

Having now indicated in a general way the nature and purpose of this invention and, in general, the form and structure of the lock nut contemplated thereby, I will proceed to a detailed description of a preferred embodiment of the invention from which details of construction and function will be made apparent; all with reference to the accompanying drawing in which.

Figure 1:
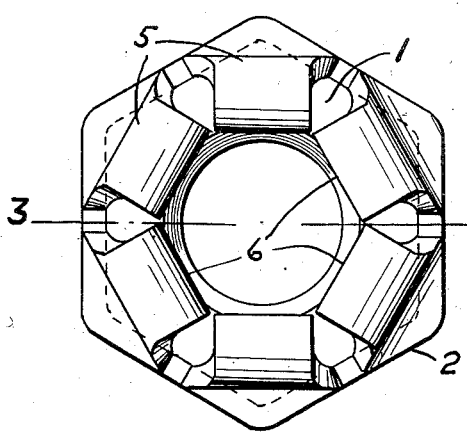
Figure 1 is a plan view of a form of lock nut embodying this invention.
Figure 3:
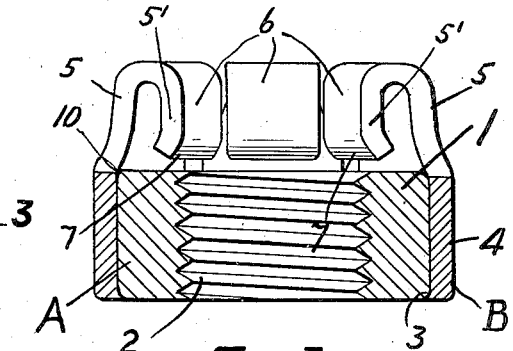
Figure 3 is a sectional view on line 3—3, Figure 1.
Figure 2:
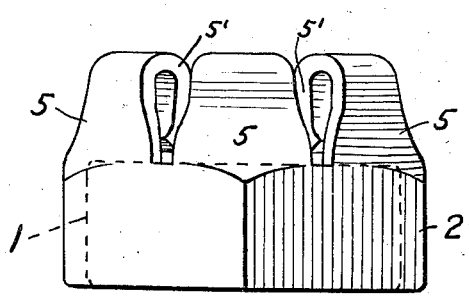
Figure 2 is a side view of the subject of Figure 1.

Referring more particularly to Figures 1-3, A indicates a nut, for example, of standard form and material and comprising a body 1 of hexagonal form, bored and tapped to provide the thread 2, for engagement with a bolt, and having its corners adjacent its lower face champhered, as indicated at 3.

The nut may be of any design and may be formed of any desired material, as, for example, iron, steel, or the like, or a non-ferrous metal, as aluminum, magnesium, an alloy, or other desired material adapting it for desired service. And, as may be desired, may be heat or otherwise treated as may enhance the properties of the material of which it is formed.

B indicates a locking element having a body 4, which conforms to and closely embraces the body of the nut. The lower edge of the body 4 is swaged into the champhers 3 at the lower face of the nut in order to secure the body to the nut as a unit. The body may, of course, be secured to the nut to form a unit in any desired manner, as, for example, by shrinking, sweating, welding, or simply forming a portion of the shell over the champher of the nut body, or other desired manner adaptable for securing the body 4 to the nut.

Extending from the upper end of the body 4 are a plurality of extensions 5, which are bent inwardly upon themselves to form the locking fingers 5' presenting areas or faces 6 extending generally parallel to the bore of the nut. The fingers 5' are of even number, arranged so that the areas or faces 6 of the fingers of each pair will face each other, the opposed faces being spaced a distance less than the diameter of the bore of the nut taken at the bottom of the thread. And the free ends of the fingers are bent or curved outwardly, as at 7, so that the distance between the free ends is greater than the diameter of the bore of the nut taken at the bottom of the thread, forming a cam on the free end of each finger.

The extensions 5, bent upon themselves to form the fingers 5', are essentially springs acting to resist pressure applied to the areas or faces 6.

The locking element may be formed of any desired material, which may be the same or different from that of which the nut is formed, so long as the material is such that the extensions 5 will have the indicated spring effect, and, if desired, the extensions 5 may be treated to enhance the spring effect acting on the fingers 5'.

It will be appreciated that the number of fingers 5' which may be provided may vary widely. Preferably the fingers 5' will be closely grouped, as generally shown. However, the provision of one or more pairs of fingers, presenting a pair or pairs of opposite areas or faces 6, is contemplated.

While not essential, it will be effective if the spacing between opposite areas or faces 6 is less than the bore of the nut by about twice the depth of the thread; and the outwardly bent end portions 7 of the fingers may extend outwardly of the areas or faces 6 a distance slightly greater than the depth of the thread.

Figure 5:
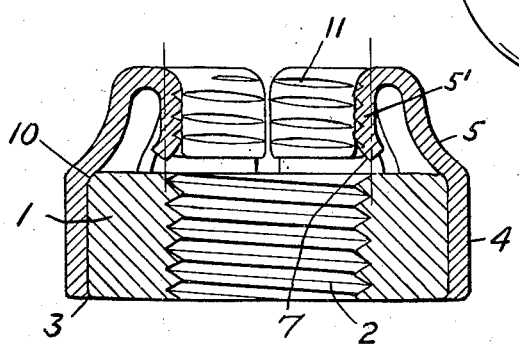
Figure 5 is a sectional view showing a modification of the structure shown in Figures 1-4.

Referring to Figure 5, it will be noted that the areas or faces 6 of the fingers 5' are tapped, as at 11, in continuation of the thread of the nut, but to a lesser depth than the thread of the nut.

If desired, the body 4 of the locking element B may be made cup-shaped with a central aperture in its bottom corresponding to the bore of the nut. In such case the nut will rest in the body and be secured therein by swaging the upper end of the body at points over the upper end of the nut, or by bending the extensions 5 in over the upper face of the nut, as shown at 10, Figure 3.

Figure 4:
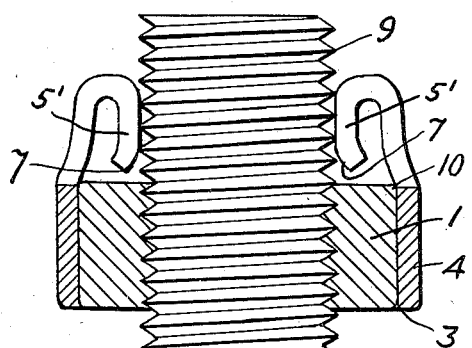
Figure 4 is a view, partly in section, showing the structure illustrated in Figures 1-3, applied to a bolt.

In operation, when the nut is threaded onto a bolt 8, as shown in Figure 4, the end of the bolt will engage the outwardly bent end portions 7 of the fingers 5' and force the fingers outwardly against their spring action, causing the areas or faces 6 to bear against the crest of the thread 9 on the bolt.

The spring effect of the extensions 5 will cause the fingers 5' to exert a lateral pressure on the bolt thread, which will firmly lock the nut in place.

Variously, where the material of the fingers 5' is softer than that of the bolt, the bolt thread will cut more or less into the areas or faces 6, thus increasing the bearing between the fingers and the thread. Again, where the areas or faces 6 are more or less pre-threaded, as at 11, Figure 5, the area of bearing of the fingers 5' on the thread of the bolt will be increased.

As will be obvious, the nut A may be produced in any usual manner and the locking element B may be produced from a blank by well known drawing, cutting and bending operations.

It will be appreciated that various modifications from the above specific disclosure may be made without departing from this invention and within the scope of the appended claims.

What I claim and desire to protect by Letters Patent is:

1. In combination, a nut, a shell conforming to the periphery of the nut and in contact with the faces thereof, a plurality of annularly disposed portions of said shell extending beyond one end of the nut and bent back upon themselves to provide laterally yieldable fingers, the diameter defined by the inner surfaces of said fingers being normally less than the maximum diameter of the internal thread of the nut, whereby to enable said fingers to be forced radially outward as an incident to their engagement with threads of a screw projecting beyond the nut, and means for securing the nut and shell against axial separation.

2. In combination, a nut, a shell conforming to the periphery of the nut and in contact with the faces thereof, a plurality of annularly disposed portions of said shell extending beyond one end of the nut and bent back upon themselves to provide laterally yieldable fingers, the diameter defined by the inner surfaces of said fingers being normally less than the maximum diameter of the internal thread of the nut, whereby to enable said fingers to be forced radially outward as an incident to their engagement with threads of a screw projecting beyond the nut, and means overlying the end of the nut oppositely disposed from said fingers for securing the nut and shell against axial separation.

3. In combination, a nut, a shell conforming to the periphery of the nut and in contact with the faces thereof, a plurality of annularly disposed portions of said shell extending beyond one end of the nut and bent back upon themselves to provide laterally yieldable fingers, the diameter defined by the inner surfaces of said fingers being normally less than the maximum diameter of the internal thread of the nut, whereby to enable said fingers to be forced radially outward as an incident to their engagement with threads of a screw projecting beyond the nut, the thread engaging surfaces of said fingers having shallow recesses for accommodating the crown of the thread in a complementary screw member, and means for securing the nut and shell against axial separation.

4. In combination, a nut, a shell conforming to the periphery of the nut and in contact with the faces thereof, a plurality of annularly disposed portions of said shell extending beyond one end of the nut and bent back upon themselves to provide laterally yieldable fingers, the diameter defined by the inner surfaces of said fingers being normally less than the maximum diameter of the internal thread of the nut, whereby to enable said fingers to be forced radially outward as an incident to their engagement with threads of a screw projecting beyond the nut, the free extremities of said fingers adjacent the nut being flared outwardly to facilitate accommodation of a complementary screw as it emerges from the nut, and means for securing the nut and shell against axial separation.

5. In a lock nut device, a sheet metal shell having a body portion conforming in shape with that of a conventional nut and providing an inner chamber for accommodating a nut, said shell presenting a plurality of annularly disposed portions extending from one end of the shell beyond the area normally occupied by a nut and bent back upon themselves to provide laterally yieldable fingers, the diameter defined by the inner surfaces of said fingers being normally less than the maximum diameter of the internal thread of a nut adapted to be accommodated within the chamber of the shell, whereby to enable said fingers to be forced radially outward as an incident to their engagement with threads of a screw.

6. In a lock nut device, a sheet metal shell having a body portion conforming in shape with that of a conventional nut and providing an inner chamber for accommodating a nut, said shell presenting a plurality of annularly disposed portions extending from one end of the shell beyond the area normally occupied by a nut and bent back upon themselves to provide laterally yieldable fingers, the diameter defined by the inner surfaces of said fingers being normally less than the maximum diameter of the internal thread of a nut adapted to be accommodated within the chamber of the shell, whereby to enable said fingers to be forced radially outward as an incident to their engagement with threads of a screw, the end of the shell oppositely disposed from said fingers being of sufficient length to permit overlapping of a nut accommodated by the shell for the purpose of securing the shell and an accommodated nut against axial separation.

EDMOND C. CROWTHER.